Sept. 23, 1958    I. G. DUTCHER    2,852,901
HARROW REAR-GANG STABILIZER

Filed Oct. 30, 1953    3 Sheets-Sheet 1

INVENTOR.
IVAL G. DUTCHER

BY *Andrus & Scales*

Attorneys

Sept. 23, 1958     I. G. DUTCHER     2,852,901
HARROW REAR-GANG STABILIZER
Filed Oct. 30, 1953     3 Sheets-Sheet 2
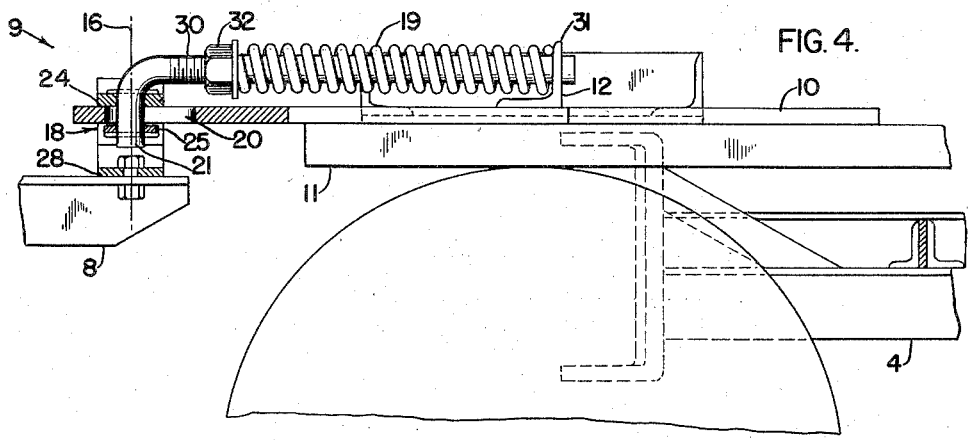
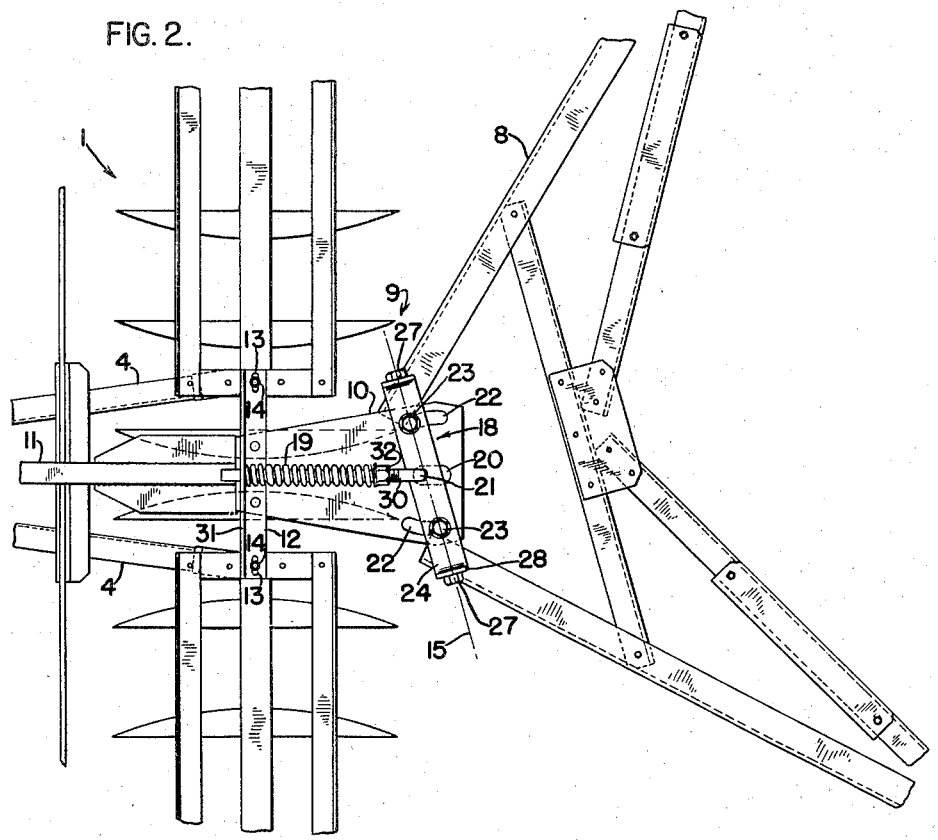
INVENTOR.
IVAL G. DUTCHER
BY *Andrus & Sceales*
Attorneys Sept. 23, 1958     I. G. DUTCHER     2,852,901
HARROW REAR-GANG STABILIZER
Filed Oct. 30, 1953     3 Sheets-Sheet 3
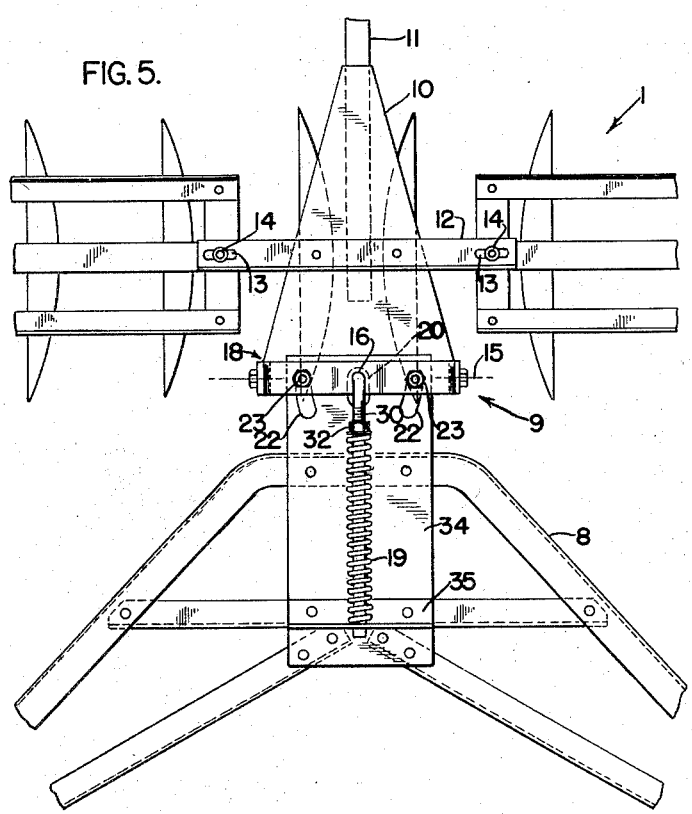
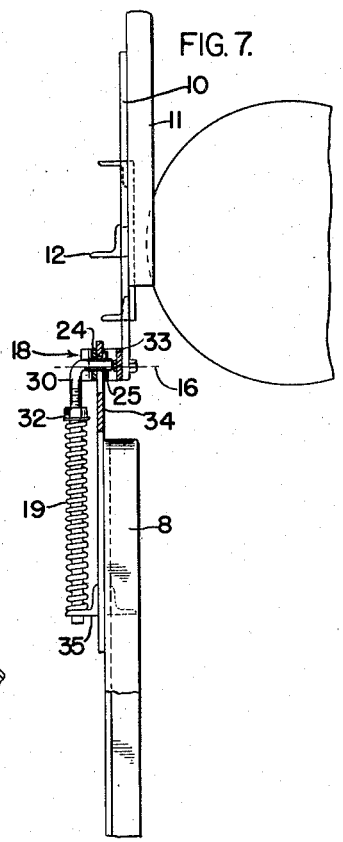
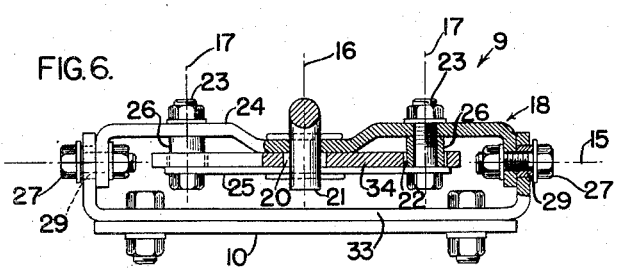
INVENTOR.
IVAL G. DUTCHER
BY *Andrus e Sceales*
Attorneys

United States Patent Office 2,852,901
Patented Sept. 23, 1958

2,852,901

HARROW REAR-GANG STABILIZER

Ival G. Dutcher, Rockford, Ill., assignor to J. I. Case Company, Racine, Wis., a company of Wisconsin Application October 30, 1953, Serial No. 389,261

2 Claims. (Cl. 55—83)

This invention relates to a harrow rear-gang stabilizer.

In tandem disk harrows it has been proposed to provide a draft gear for the rear gang employing laterally spaced floating pivots which tend to shift the pull load to the outside or far pivot whenever the rear gang tends to move out of alinement relative to the front gang as on a slight curve, uneven ground, side hill or other cause for unbalanced pull load.

In general such proposal has actually made the rear gang of the harrow less stable and more susceptible to displacement by lateral forces. The free floating character of the pivots tended to provide an undesirable forward and rearward slapping action at times between the front and rear gangs. Furthermore, the construction has made it more difficult to provide the necessary vertical relative movement between the front and rear gangs without losing a certain amount of rigidity and strength of the device.

The present invention overcomes these and other difficulties by biasing the rear gang to a central position relative to the front gang whereby the gangs are retained in closer alignment. The invention additionally provides a connection that gives greater freedom of vertical pivoting between the front and rear gangs.

In carrying out the invention a spring or other suitable biasing means is employed to resist the freedom of relative lateral pivoting between the front and rear gangs, whereby shifting of the load from one pivot to the other pivot is resisted by the spring. Vertical pivoting between the gangs is provided by a simple universal connection without interfering with the actuation of the stabilizer.

The drawings furnished herewith illustrate the best mode of carrying out the invention as presently contemplated and set forth hereinafter.

In the drawings:

Fig. 2 is a detail top plan view of a part of the harrow of Fig. 1 with the rear gang forced to one side and showing the operation of the stabilizer;

Fig. 4 is an enlarged detail side elevation showing parts broken away and sectioned longitudinally of the stabilizer;

Fig. 5 is a detail plan view showing a modified form of construction;

Fig. 6 is a view similar to Fig. 3 showing the modification of Fig. 5; and

Fig. 7 is a view similar to Fig. 4 showing the modification of Fig. 5.

Figure 1:
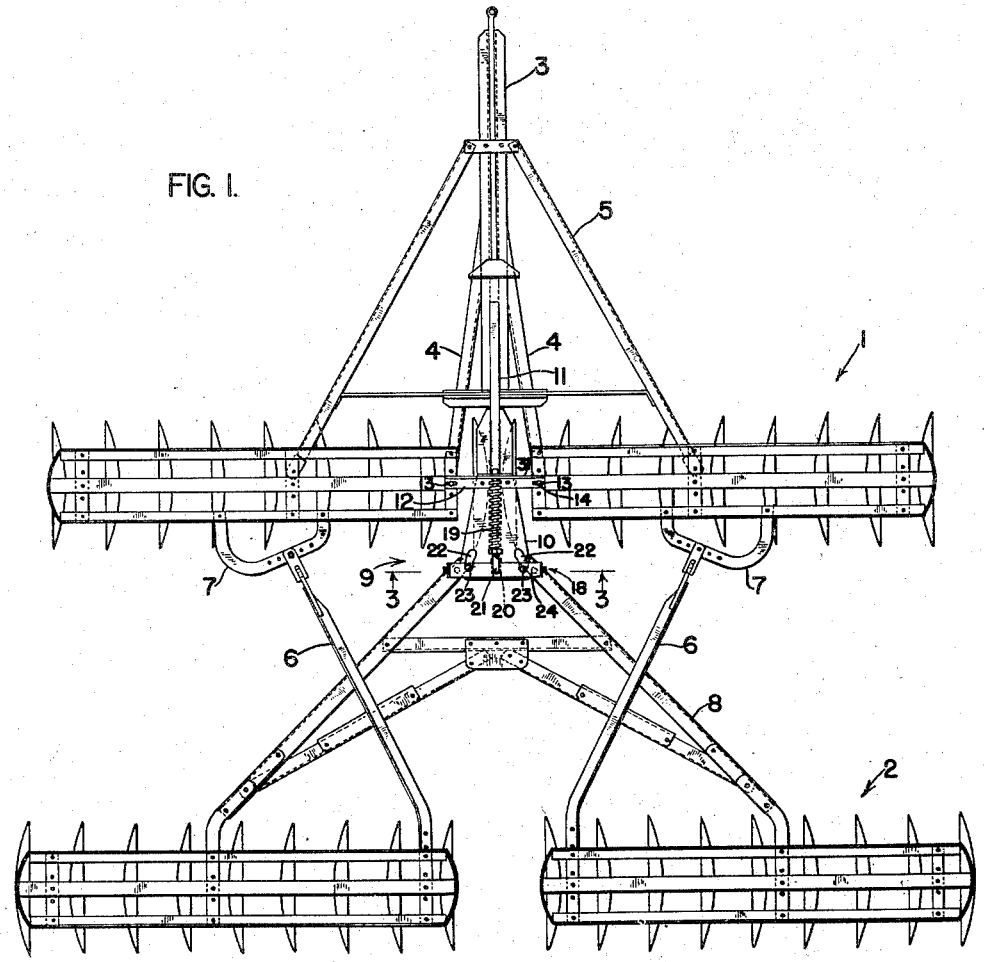
Figure 1 is a top plan view of the harrow with the front and rear gangs in alignment.
Figure 3:
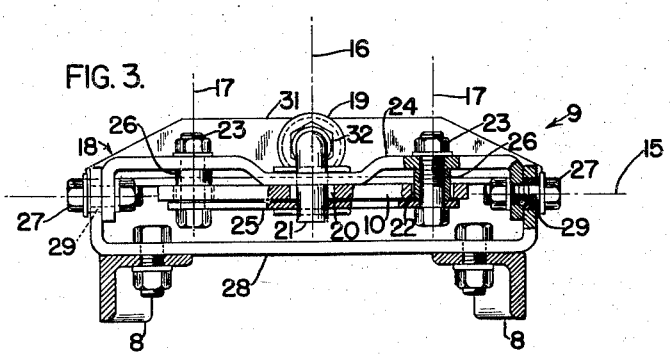
Fig. 3 is an enlarged detail section taken on line 3—3 of Fig. 1 transversely of the stabilizer.

The harrow comprises, in general, a pair of disc harrow members constituting the front gang 1, a similar pair of disc harrow members constituting the rear gang 2, and a draw bar 3 secured by members 4 to the front gang and extending centrally forwardly thereof for attachment to a tractor, not shown. An adjustable A-frame 5 is secured to draw bar 3 and has its free legs secured to the corresponding members of the front gang.

The draw members 4 and A-frame 5 cooperate to provide angular adjustment of the members of the front gang 1.

The rear gang 2 is drawn by a pair of drawn members 6 having their forward ends adjustably attached to brackets 7 on the corresponding members of the front gang 1 and having their rear ends secured to the inner ends of the members of the rear gang 2.

An A-frame 8 has the free ends of its outer legs secured to the corresponding members of rear gang 2 outwardly of the securement of draw members 6 to the members to provide for draw of the rear gang and for angular adjustment of the gang members.

According to the present invention the stabilizer mechanism 9 connects the apex of A-frame 8 to draw bar 3 and provides for limited lateral pivoting and for vertical pivoting of the front gang 1 and rear gang 2 relative to each other.

The stabilizer mechanism 9 comprises a horizontal plate 10 welded to a reach 11 extending rearwardly from draw bar 3. A cross bar 12 is secured across the top of plate 10 and has its ends pivotally secured to the corresponding inner ends of the members of front gang 1. For this purpose the ends of cross bar 12 have longitudinally extending slot apertures 13 which receive collared bolts 14 secured in the end frames of the members of the front gang 1.

The rear end of plate 10 is pivotally connected to A-frame 8 on a horizontal transverse axis 15 which provides for relative vertical movement between the front gang 1 and the rear gang 2, and on a vertical axis which floats longitudinally of the longitudinal center line for reach 11 and draw bar 3 to provide for lateral shifting of the rear gang 2 relative to the front gang 1.

A pair of laterally spaced pivots 17, at least one of which is adapted to float generally longitudinally of the direction of draw for the harrow, are additionally provided between A-frame 8 and plate 10, and function to shift the pull load of the connection towards a side opposite to that toward which the rear gang moves. Pivots 16 and 17 are secured in a transverse bracket 18 which provides for relative angular floating between plate 10 and A-frame 8.

The center axis 16 is biased by spring means 19 in a direction which tends to retain the two laterally spaced pivots 17 in a transverse line normal to the longitudinal center line of reach 11 and draw bar 3.

Various constructions may be employed for the stabilizer mechanism within the requirements of the above pivot arrangement.

The construction illustrated in Figs. 1 to 4, inclusive, has bracket 18 secured to the A-frame 8 and spring 19 carried by plate 10, while the construction illustrated in Figs. 5 to 7, inclusive, has bracket 18 secured to plate 10 and spring 19 carried by the A-frame.

In the construction of Figs. 1 to 4 the rear end of plate 10 is provided with a central slot aperture 20 extending longitudinally of the plate for receiving a vertical pin 21 which determines the floating axis 16. A pair of spaced curved slots 22 in plate 10 on opposite sides of slot 20 receive the collared bolts 23 which constitute the pivots 17 when the bolts are at the rear ends of the slots.

A pivot bar 24 extends transversely across plate 10 and has corresponding close fitting apertures for receiving pin 21 and bolts 23. A strap 25 similar to bar 24 extends transversely immediately beneath plate 10 and has corresponding close fitting apertures for receiving pin 21 and bolts 23. The bolts 23 carry cylindrical collars 26 between bar 24 and strap 25 and which provide for tightening the bolts and rigidly securing the pivot bar and strap with plate 10 floating therebetween.

The pivot bar 24 has its free ends flanged downwardly and apertured to receive the horizontal bolts 27 providing the pivot axis 15 for the assembly.

The A-frame 8 has a transverse bar constituting a bracket 28 with its ends flanged upwardly and apertured to receive the corresponding bolts 27. The apertures in the bracket 28 are of a size to receive corresponding collars 29 on bolts 27 and which extend through the respective flange and abut the corresponding flange on pivot bar 24 and the head of the corresponding bolt 27.

So long as the rear gang 2 remains directly centered behind the front gang 1 both pivot bolts 23 with their collars 26 engage the rear ends of their corresponding slots 22.

When the forces on the rear gang become unbalanced there is a tendency for the gang 2 to move out of alignment with the front gang 1, in which event the pivot bar 24 is moved to an angular position as shown in Fig. 2. The pivot 17 provided by the bolt 23 on the side toward which the rear gang 2 moves, moves forwardly in its slot 22, leaving the pull load entirely to the bolt 23 engaging the rear end of the slot 22 on the opposite side of plate 10.

According to the present invention the pin 21 has a push rod 30 which extends forward through an aperture in an upstanding transverse flange 31 on cross bar 12. Spring 19 is shown as a compression coil spring surrounding push rod 30 and confined between flange 31 and an adjustable nut 32 on the push rod.

Spring 19 is pre-compressed between nut 32 and flange 31 to normally urge pivot bar 24 to a straight transverse position corresponding to a center position for the rear gang 2 where it is aligned with the front gang 1.

When the rear gang 2 tends to move to either side as shown in Fig. 2 the pin 21 is moved forwardly in central slot 20 and push rod 30 carries nut 32 forwardly to additionally compress spring 19. Spring 19 tends to return the rear gang 2 to the desired center position as shown in Fig. 1.

In the construction of Figs. 5 to 7 the rear end of plate 10 is secured to the underside of a cross bar 33 corresponding to bracket 28 and which has upstanding end flanges carrying the bolts 27 on axis 15.

The A-frame 8 carries a slotted plate 34 which extends forwardly between the pivot bar 24 and strap 25 and has the center slot 20 and curved side slots 22 receiving the corresponding pin 21 and bolts 23.

The push rod 30 extends rearwardly through an upstanding flanged lug 35 on the rear end of plate 34, and spring 19 is confined between lug flange 35 and the nut 32 on the push rod.

The pivot bolts 23 normally engage the forward ends of slots 22 in this embodiment and tend to move rearwardly in the corresponding slot on the side toward which the rear gang moves. Spring 19 operates to bias the plate 34 to normal central position where the rear gang 2 is aligned with the front gang 1.

By providing bracket 28 or the corresponding cross bar 33 to carry the pivot bolts 27 constituting axis 15, the invention enables the front and rear gangs to move vertically relative to each other with considerable freedom.

The central slot 20 should be so large as to provide complete freedom of movement of pin 21 without engagement of the edge of the slot by the pin. The slots 22 serve as guides for pivot bolts 23 and are curved on a radius to provide for the indicated pivoting of pivot bar 24.

Various modes of carrying out the invention are contemplated as within the scope of the following claims particularly pointing out and distinctly claiming the subject matter which is regarded as the invention.

I claim:

1. A stabilizer for the rear gang of tandem disk harrows and the like having a front gang and a rear gang in tandem, comprising a transverse member connected to one of said gangs, a horizontal plate member carried by the other gang and having a slot therein along the longitudinal center line thereof and a pair of laterally spaced slots on opposite sides thereof, one of said members being connected to the corresponding gang by horizontal transverse pivotal means, a pair of pins fixed to said first member and extending through the corresponding laterally spaced slots and normally engaging corresponding ends of the slots to serve as draw means for the rear gang, a push rod extending substantially parallel to the longitudinal center line of said plate member and having its outer end formed vertically to extend through said first named slot and through said first named member to move with the latter, a coil compression spring disposed on the horizontal portion of said push rod and confined between an abutment threaded upon said push rod and an abutment fixed to said plate member, whereby said spring urges said transverse member to effect engagement of said pins with the draw ends of the corresponding laterally spaced slots in which position the rear gang is maintained in alignment with the front gang, said spring yielding on turns of the harrow to permit said transverse member to move into an angular position relative to said plate member wherein only one of the pins engages the draw end of its slot and functions as the draw means, and the other pin moves in its slot away from the draw end in response to said relative angular movement of said members.

2. A stabilizer for the rear gang of tandem disk harrows and the like having a front gang and a rear gang in tandem, comprising a transverse member connected to one of said gangs, a horizontal plate member carried by the other gang and having an abutment on the longitudinal center line thereof and a pair of laterally spaced slots on opposite sides thereof, one of said members being connected to the corresponding gang by horizontal transverse pivotal means, a pair of pins fixed to said first member and extending through the corresponding laterally spaced slots and normally engaging corresponding ends of the slots to serve as draw means for the rear gang, a push rod extending substantially parallel to the longitudinal center line of said plate member and having its outer end formed vertically and pivoted in said first named member and movable with the latter, the other end of said rod extending freely through said abutment on said plate, an abutment threaded on said rod and facing said plate abutment, a coil compression spring disposed on the horizontal portion of said push rod and confined between said abutments, whereby said spring urges said transverse member to effect engagement of said pins with the draw ends of the corresponding laterally spaced slots in which position the rear gang is maintained in alignment with the front gang, said spring yielding on turns of the harrow to permit said transverse member to move into an angular position relative to said plate member wherein only one of the pins engages the draw end of its slot and functions as the draw means, and the other pin moves in its slot away from the draw end in response to said relative angular movement of said members.

References Cited in the file of this patent

UNITED STATES PATENTS

| | | |
|---|---|---|
| 1,337,448 | French | Apr. 20, 1920 |
| 1,558,321 | White | Oct. 20, 1925 |
| 1,612,165 | White | Dec. 28, 1926 |
| 1,734,397 | Peterson | Nov. 5, 1929 |
| 1,830,993 | Furrer | Nov. 10, 1931 |